(12) United States Patent
Perez

(10) Patent No.: US 6,394,633 B1
(45) Date of Patent: May 28, 2002

(54) GUIDANCE AND SAFETY ILLUMINATION FOR BABY CARRIAGES

(76) Inventor: Angel L. Perez, 11142 Dora Dr., Philadelphia, PA (US) 19154

( * ) Notice: Subject to any disclaimer, the term of this patent is extended or adjusted under 35 U.S.C. 154(b) by 0 days.

(21) Appl. No.: 09/524,265

(22) Filed: Mar. 13, 2000

(51) Int. Cl.$^7$ ............................................... F21V 33/00
(52) U.S. Cl. .................. 362/459; 362/234; 362/184; 362/249; 362/540; 362/543; 280/478.3; 280/647
(58) Field of Search .................. 362/253, 247, 362/184, 234, 459, 543, 540, 486; 280/47.38, 647, 650; 340/686.2

(56) References Cited

U.S. PATENT DOCUMENTS

| 4,896,894 A | * | 1/1990 | Singletary ..................... 280/30 |
| 5,193,896 A | * | 3/1993 | Oberlander .................. 362/103 |
| 5,806,924 A | * | 9/1998 | Gonas .................... 297/216.11 |
| 5,938,216 A | * | 8/1999 | Weng ....................... 280/47.38 |

* cited by examiner

Primary Examiner—Thomas M. Sember
(74) Attorney, Agent, or Firm—Paul Maleson

(57) ABSTRACT

A baby carriage or stroller is provided with a built-in illumination electrical system, powered by a replaceable or rechargeable battery or by a solar panel. A headlamp or headlamps at the front illuminate the intended pathway of the carriage. Side lamps and a rear or tail lamp or lamps may be provided. The side and rear lamps are typically red as warnings. An interior or baby-illuminating lamp may be provided. One switch controls the interior light and another switch controls the other lights.

3 Claims, 2 Drawing Sheets

GUIDANCE AND SAFETY ILLUMINATION FOR BABY CARRIAGES

BACKGROUND OF THE INVENTION

1. Field of the Invention

This invention relates to baby carriages and strollers. It relates to a safety-enhancing means for these devices, more particularly and as an important part of the invention, means to illuminate the path of the device. It also contemplates providing side and tail or rear lights on baby carriages and strollers and providing illumination on the baby itself, which may be termed interior illumination.

2. Background of the Invention and Prior Art

It will be appreciated that the principles and structure apply as well to strollers and baby carriages of any known or conventional kind, and to those that may have other innovative features which do not conflict with or involve the structure of this invention.

It has been known to provide baby amusement lights on carriages and to provide reflectors on carriages. It has also been known to provide reflectors and warning lights on various devices such as skate boards. It has been known to provide vacuum cleaners and the like with lamps. To the knowledge of the inventor, it has not been known to provide guidance illumination to baby carriages, that is, illumination means to illuminate the path immediately before the moving baby carriage. To the knowledge of the inventor, it has not been known to provide electric lights as side or rear lights on baby carriages. To the knowledge of the inventor, it has not been known to provide electric illumination of the interior of the carriage; that is, of the baby.

U.S. Pat. No. 5,938,216 discloses a baby carriage with a light and sound device clamped to the side of the carriage and intended to amuse the baby. No guidance light is or can be provided by this device.

Patent D393,087 discloses the ornamental design of a decorative set of lights on roller blades.

Patent D407511 provides what amounts to a square flashlight and separate switch which is titled to indicate that it is for a baby carriage, but which discloses no connection with such a carriage.

U.S. Pat. No. 5,677,790 discloses a light reflecting device and shows it clipped to many different items, including shoes, socks, dog leashes, carriages, wristlets and sleeves. The reflector is not powered; it is passive and can give no guidance illumination.

Though some of the prior patents cited above relate to devices other than baby carriages or strollers, it is believed that such expedients are not in the field of art of the present invention nor do they suggest the present invention by their disclosures.

SUMMARY AND OBJECTS OF THE INVENTION

In this patent, the terms "baby carriage" and "carriage" include all such carriages as has been stated above, and also includes devices generally called "strollers", and such devices which may be foldable and may be convertible between carriage and stroller. In this patent, the terms "lamp" and "light" may be used interchangeably and the terms "carriage", "baby carriage" and "stroller" may be used interchangeably.

Parents and others push baby carriages on walks on sidewalks and streets. At times, these strolls or walks may be in conditions of diminished visibility, as at dusk, or night, or in rainy or otherwise inclement weather. Quite apart from the question of enhancing visibility of the carriage to others (which is nevertheless is an aspect of this invention), a most important and critical aspect is throwing a field of light ahead of the carriage. Breaks, cracks, potholes, curbs and other discontinuities may produce serious and undesired effects on the movement of the carriage, particularly for example, where a small infant is involved, possibly asleep or with a bottle. Thus, the local headlight effect of this invention is critical. The electrical system is built into the structure of the carriage. This integration permits the addition of side and rear warning lights. It also permits the addition of what may be described as an interior light, that is, a lamp to illuminate the interior of the carriage, and thus the face or body of the child. Such interior illumination may be important to aid in checking on the baby under adverse ambient lighting conditions. The headlamp aspect and the interior lighting aspect may be independently switch controlled. The system may preferably be powered by replaceable or rechargeable batteries.

Since baby carriages are typically used more in sunshine than in dark conditions, it is a variant of this invention to provide recharging of batteries by small solar panels on the carriage, with possible supplemental conventional recharging.

DESCRIPTION OF THE PREFERRED EMBODIMENTS

Figure 2:
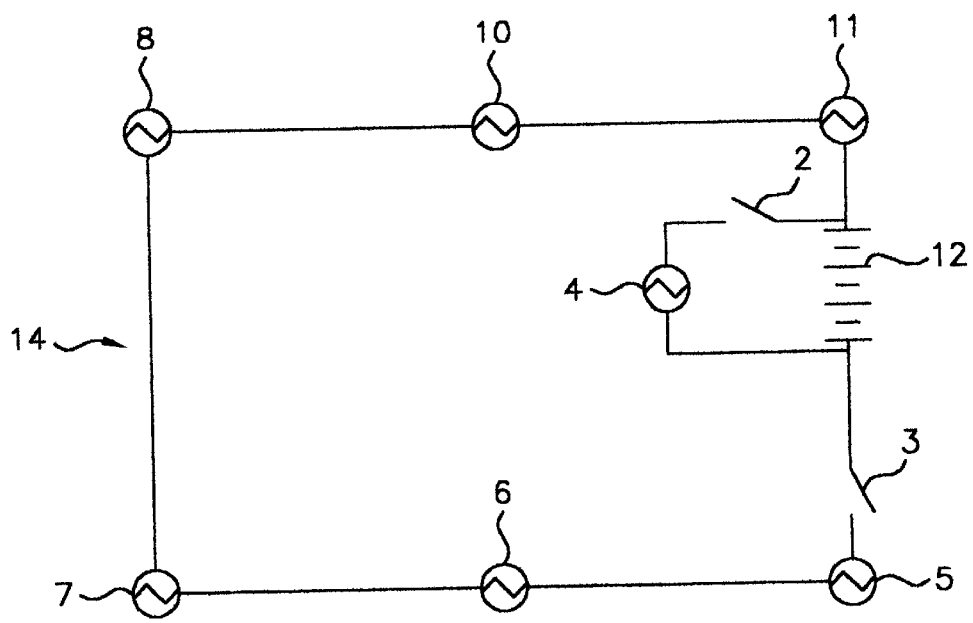
FIG. 2 is a schematic view of the electrical system of the invention.

FIG. 2 is a schematic drawing of the electrical system of the invention. The system is generally designated 14. A power source 12, generally a battery, is provided. Battery 12 may be a 6 or 12 volt battery for example. It may be a replaceable battery or set of batteries. Alternatively, it may be a rechargeable battery which may be recharged by attachment to a voltage reduction transformer and AC to DC rectifier (not shown and not itself a part of this invention). It is also within the scope of this invention to provide small solar panels (not shown) on top of the carriage, as on the hood or handlebars, to recharge the battery with supplemental line voltage recharging supplied as needed.

An "interior" lamp 4 is provided. This is independently operated by switch 2. The lamp 4 is provided on the inside of the hood or otherwise supported in a position so that the baby's face and body are illuminated.

A critical part of the invention is the provision of a pair of headlamps or guidance lamps 7 and 8. These headlamps are positioned substantially over or near the left and right front wheels respectively and close to the ground. They are provided with reflectors and lenses so as to throw fan-shaped beams of light ahead of the carriage to provide safe guidance for the forward progress of the baby carriage.

Rear warning lamps 5 and 11 are provided. These are preferably low wattage lamps with red filters. Side warning lamps 6 and 10 are provided. These also preferably are low wattage lamps with red filters. The headlamps 7 and 8, the rear lamps 5 and 11, and the side lamps 6 and 10 are all controlled by a single switch 3. While for ease of reference, the headlamps, rear lamps and side lamps are shown in FIG. 2 in what appears to be series connection, but this figure merely indicates the connections and in practice it is conventionally preferable that they be in parallel connection. It is within the preferred embodiments of this invention that either a single or double headlamp be provided. It is also within the scope of this invention to eliminate any or all of the side lamps, rear lamps, or interior lamp.

The lamps and wiring are an integral part of the baby carriage structure. If a tubular structure is used for the carriage, the wires are run inside the tubes. If a non-tubular structure is used, the wires are firmly attached to inside-facing portions of the structure. In the illustrative carriages shown in this patent, the wires are concealed within the body structure of the carriage, that is, within the baby carriage body.

Figure 1:
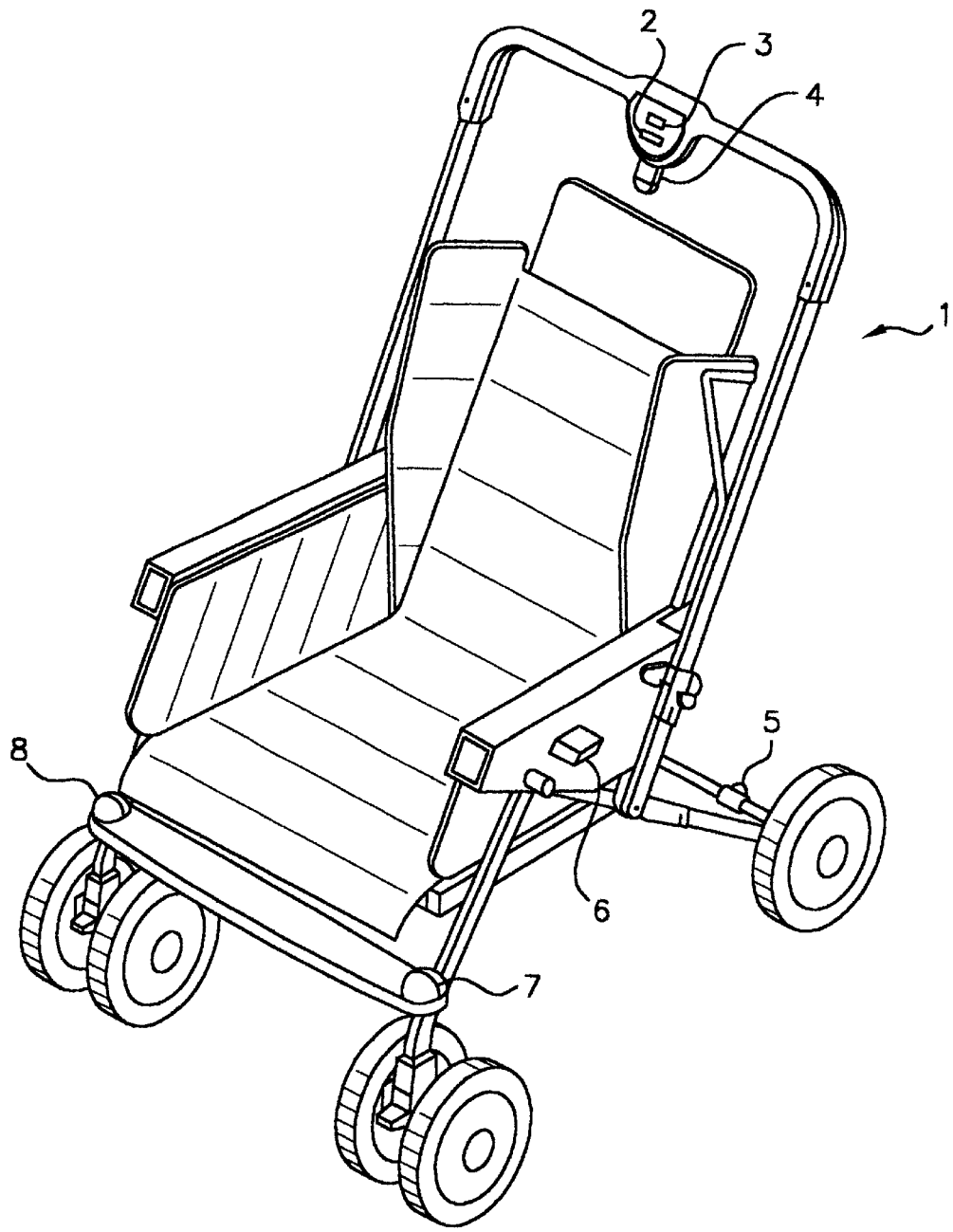
FIG. 1 is a left front perspective view of a baby carriage showing a pair of headlamps and side and rear lamps and the interior lamp in a preferred embodiment.

FIG. 1 is a perspective view, taken from the left front above of a stroller generally designated 1. The interior lamp switch 2 and the headlamp, side lamp and rear lamp switch 3 is shown mounted centered on the stroller handle. Such mounting is preferred but is not a critical limitation. The baby illumination lamp 4, which may also be designated an interior lamp or an interior-facing lamp, is shown centered on the handle, pointing down. For a stroller or carriage as illustrated in FIG. 1, without a hood or cover, such mounting is preferred but its position is not a critical limitation.

The stroller 1 is shown with a pair of forward-looking headlamps, left headlamp 7 and right headlamp 8. In the example shown, a convenient place for mounting is at the ends of the footrest above the wheels. The left side lamp 6 is shown affixed to the body of stroller 1 and the left rear or tail light 5 is shown affixed to the rear axle. The rear lamp 5 could for example within the spirit of this invention be attached to the back of the seat portion or to the downwardly extending portion of the handle. The right side rear and side lamps, as well as the battery 12 are concealed behind structure in FIG. 1. The battery 12 may be positioned beneath the seat toward the rear of the stroller.

Figure 3:
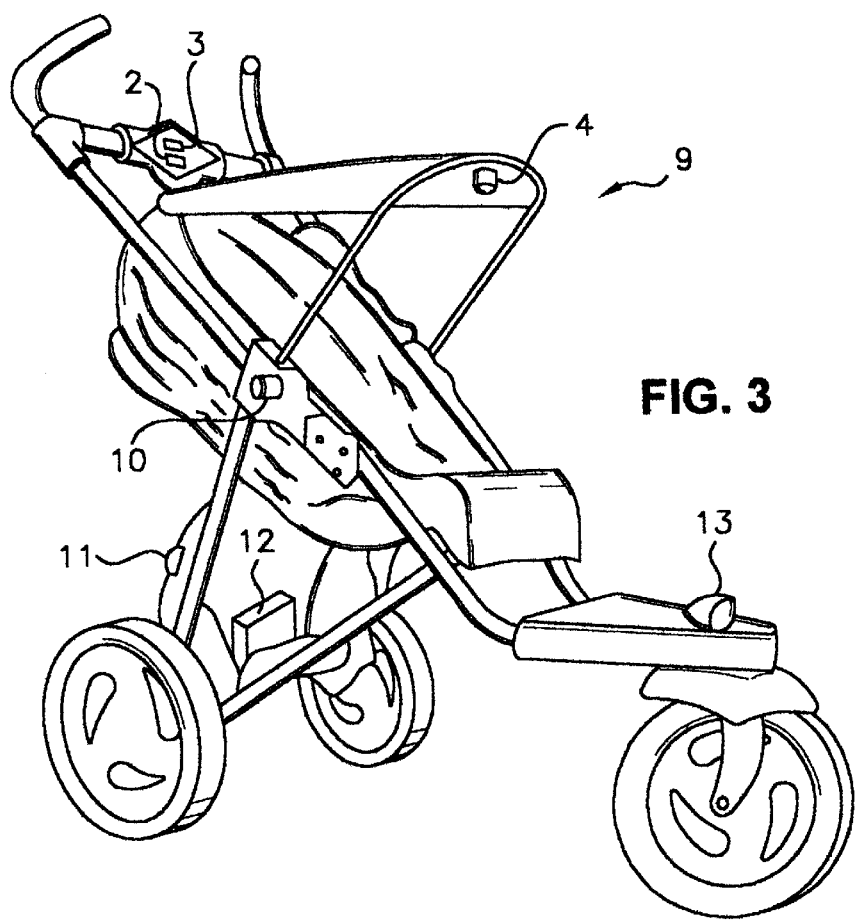
FIG. 3 is a right front perspective view of a carriage showing a single headlamp and side and rear lamps and the interior lamp in another preferred embodiment.

A somewhat different form of carriage or stroller is illustrated in FIG. 3, incorporating the present invention. Switch 2 controls interior lamp 4. Switch 3 controls the headlamp 13, the side lamps 10 and 6, and the tail lights 11 and 5. In FIG. 3, which is a right front side perspective view, only the right tail light 11 and the right side light 10 are visible. In this embodiment, the battery 12 is visible, being shown in a convenient location suspended in a pouch below the main body of the carriage 9.

Because the carriage 9 shown in FIG. 3 is of the three-wheeled type, it is more convenient to have a single headlamp 13, which is mounted above the front wheel this embodiment illustrates a covered carriage, and the interior light 4 is shown affixed to the underside of the cover.

It is apparent that the necessary wiring is run in any convenient or conventional manner through internal parts of the carriage, as through the interiors of tubular or other frame members, or may be affixed to the exterior of frame members or other elements of the device's construction. For example, wires may be affixed by adhesive, tape or by sewing of wire covers to the underside of the carriage cover.

I claim:

1. A baby carriage having a forward end and a rear end relative to the intended direction of forward progress of said carriage, an illumination system built into and comprising part of said carriage, said illumination system comprising:

a power source, a headlamp at said forward end positioned close to the ground and directed to cast a fan-shaped beam of light ahead of said carriage to provide safe guidance of said forward progress, a tail lamp at said rear end, a switch to activate said headlamp and said tail lamp, an interior-facing lamp and a separate interior lamp switch to activate said interior-facing lamp, wiring to operatively connect said power source, said headlamp, said tail lamp and said switch and separate wiring to operatively connect said power source, said interior-facing lamp, and said separate interior lamp switch.

2. A baby carriage having a forward end and a rear end relative to the intended direction of forward progress of said carriage, an illumination system built into and comprising part of said carriage, said illumination system comprising:

a power source, a headlamp at said forward end positioned close to the ground and directed to cast a fan-shaped beam of light ahead of said carriage to provide safe guidance of said forward progress, a tail lamp at said rear end, A right side lamp and a left side lamp, a switch to activate said headlamp, said tail lamp, and said right side lamp and said left side lamp, wiring to operatively connect said power source, said headlamp, said tail lamp, said right side lamp and said left side lamp and said switch.

3. A baby carriage as set forth in claim 2 wherein said illumination system additionally comprises:

an interior-facing lamp and a separate interior lamp switch to activate said interior-facing lamp, and separate wiring to operatively connect said power source, said interior-facing lamp, and said separate interior lamp switch.

* * * * *